US010832695B2

United States Patent
Mouncer et al.

(10) Patent No.: US 10,832,695 B2
(45) Date of Patent: Nov. 10, 2020

(54) MOBILE AUDIO BEAMFORMING USING SENSOR FUSION

(71) Applicant: Microsoft Technology Licensing, LLC, Redmond, WA (US)

(72) Inventors: Brian Eugene Mouncer, Kirkland, WA (US); Syavosh Zadissa, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/276,523

(22) Filed: Feb. 14, 2019

(65) Prior Publication Data
US 2020/0265860 A1   Aug. 20, 2020

(51) Int. Cl.
| | |
|---|---|
| *G10L 21/0264* | (2013.01) |
| *H04R 3/00* | (2006.01) |
| *H04R 5/04* | (2006.01) |
| *G02B 27/01* | (2006.01) |
| *G06F 3/01* | (2006.01) |
| *H04R 5/027* | (2006.01) |
| *G10L 21/0216* | (2013.01) |

(52) U.S. Cl.
CPC ...... *G10L 21/0264* (2013.01); *G02B 27/0172* (2013.01); *G06F 3/017* (2013.01); *H04R 3/005* (2013.01); *H04R 5/027* (2013.01); *H04R 5/04* (2013.01); *G02B 2027/0138* (2013.01); *G10L 2021/02166* (2013.01)

(58) Field of Classification Search
CPC ...... G10L 21/0264; G10L 2021/02166; G02B 27/0172; G02B 2027/0138; G06F 3/017; H04R 3/005; H04R 5/027; H04R 5/04

USPC .......................................... 381/26, 92, 71.1
See application file for complete search history.

(56) References Cited

U.S. PATENT DOCUMENTS

| | | |
|---|---|---|
| 7,428,000 B2 | 9/2008 | Cutler et al. |
| 7,536,029 B2 | 5/2009 | Choi et al. |
| 9,432,768 B1 * | 8/2016 | O'Neill ................. H04R 3/005 |

(Continued)

OTHER PUBLICATIONS

Aarabi, Parham, "The Fusion of Distributed Microphone Arrays for Sound Localization", In EURASIP Journal on Applied Signal Processing, Jan. 1, 2003, pp. 338-347.

(Continued)

*Primary Examiner* — Ahmad F. Matar
*Assistant Examiner* — Sabrina Diaz
(74) *Attorney, Agent, or Firm* — Alleman Hall Creasman & Tuttle LLP

(57) ABSTRACT

Audio receive beamforming is performed by a computing system. A set of audio signals are obtained via a microphone array and a set of inertial signals are obtained via a set of inertial sensors of a mobile device. A location of a targeted object to beamform is identified within a camera feed captured via a set of one or more cameras imagining an environment of the mobile device. A parameter of a beamforming function is determined that defines a beamforming region containing the targeted object based on the set of inertial signals and the location of the targeted object. The beamforming function is applied to the set of audio signals using the parameter to obtain a set of processed audio signals that increases a signal-to-noise ratio of an audio source within the beamforming region relative to the set of audio signals.

20 Claims, 7 Drawing Sheets

(56) References Cited

U.S. PATENT DOCUMENTS

| | | |
|---|---|---|
| 2005/0008169 A1 | 1/2005 | Muren et al. |
| 2012/0155703 A1 | 6/2012 | Hernandez-abrego et al. |
| 2012/0163625 A1 | 6/2012 | Siotis et al. |
| 2013/0083944 A1 | 4/2013 | Kvist et al. |
| 2013/0258813 A1* | 10/2013 | Herre .................. H04R 1/406 367/135 |
| 2013/0332156 A1 | 12/2013 | Tackin et al. |
| 2014/0006026 A1* | 1/2014 | Lamb .................. G10L 17/00 704/246 |
| 2014/0337023 A1* | 11/2014 | McCulloch ............ G06F 1/163 704/235 |
| 2015/0281839 A1 | 10/2015 | Bar-on et al. |
| 2015/0358579 A1 | 12/2015 | Shin |
| 2016/0249132 A1 | 8/2016 | Oliaei |
| 2017/0045941 A1 | 2/2017 | Tokubo et al. |
| 2017/0098453 A1 | 4/2017 | Wright et al. |

OTHER PUBLICATIONS

Kelly, Damien, "Active Speaker Localisation and Tracking using Audio and Video", In Dissertation of University of Dublin, Mar. 2010, 218 Pages.

"International Search Report and Written Opinion issued in PCT Application No. PCT/US2020/014682", dated Jul. 1, 2020, 27 Pages.

\* cited by examiner

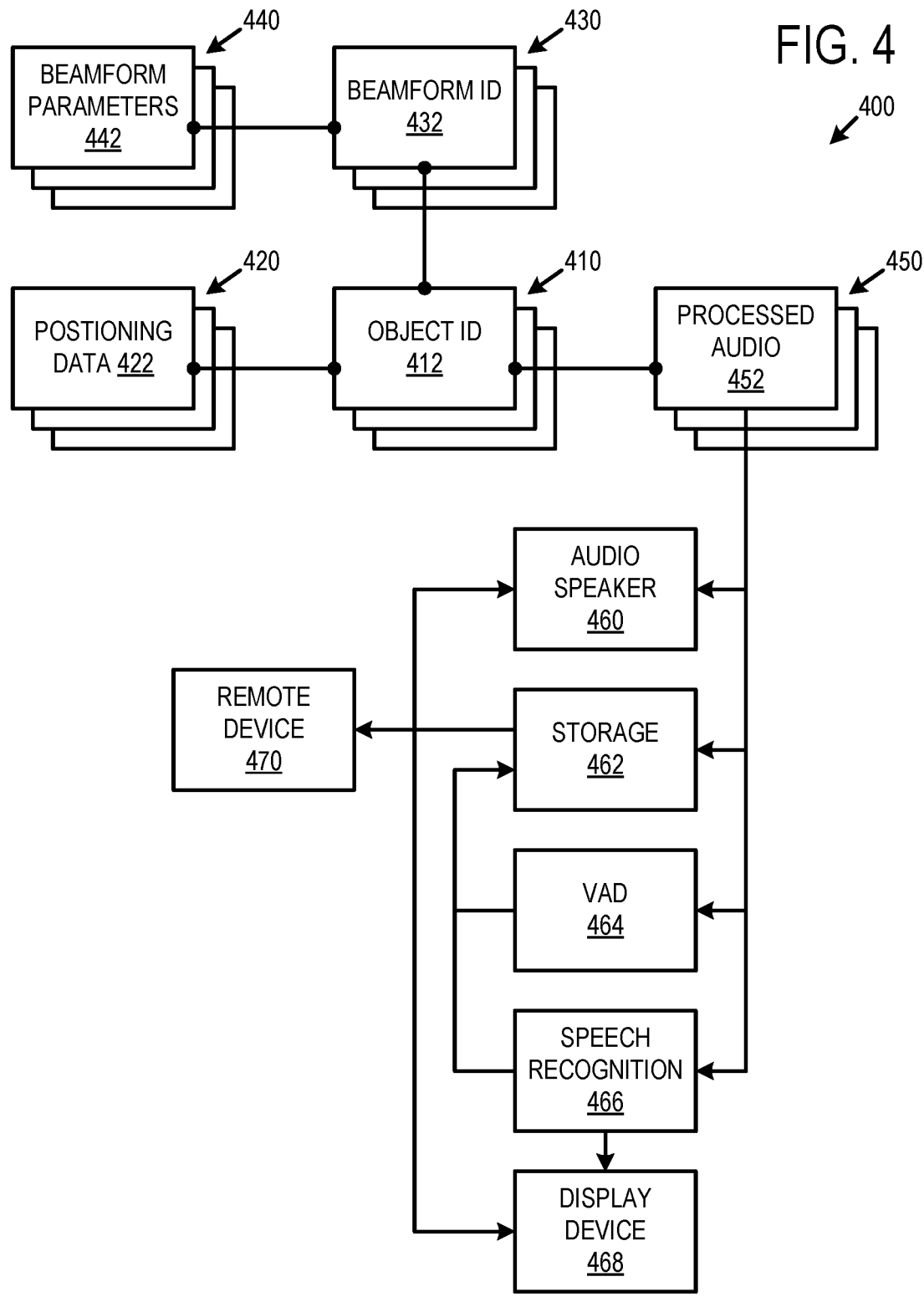

MOBILE AUDIO BEAMFORMING USING SENSOR FUSION

BACKGROUND

Beamforming may be used to improve a signal-to-noise ratio of a signal of interest within a set of received signals. For example, audio receive beamforming may be applied to audio captured by a microphone array through spatial filtering of audio signals output by the array's multiple microphones. Adaptive beamforming may be used to detect a signal of interest in the audio signals output by the array.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In an example, audio receive beamforming is performed by a computing system. A set of audio signals is obtained via a microphone array and a set of inertial signals are obtained via a set of inertial sensors of a mobile device. The microphone array and the set of inertial sensors have a shared reference frame. A location of a targeted object to beamform is identified within a camera feed captured via a set of one or more cameras imagining an environment of the mobile device. A parameter of a beamforming function is determined that defines a beamforming region containing the targeted object based on the set of inertial signals and the location of the targeted object. The parameter may include a beam vector originating at the microphone array and intersecting the targeted object, as an example. The beamforming function is applied to the set of audio signals using the parameter to obtain a set of processed audio signals. Application of the beamforming function may increase a signal-to-noise ratio of an audio source within the beamforming region for the set of processed audio signals. The set of processed audio signals is output by the computing system.

BRIEF DESCRIPTION OF THE DRAWINGS

FIG. 4 is a schematic diagram depicting an example data relationship.

DETAILED DESCRIPTION

Figure 1:
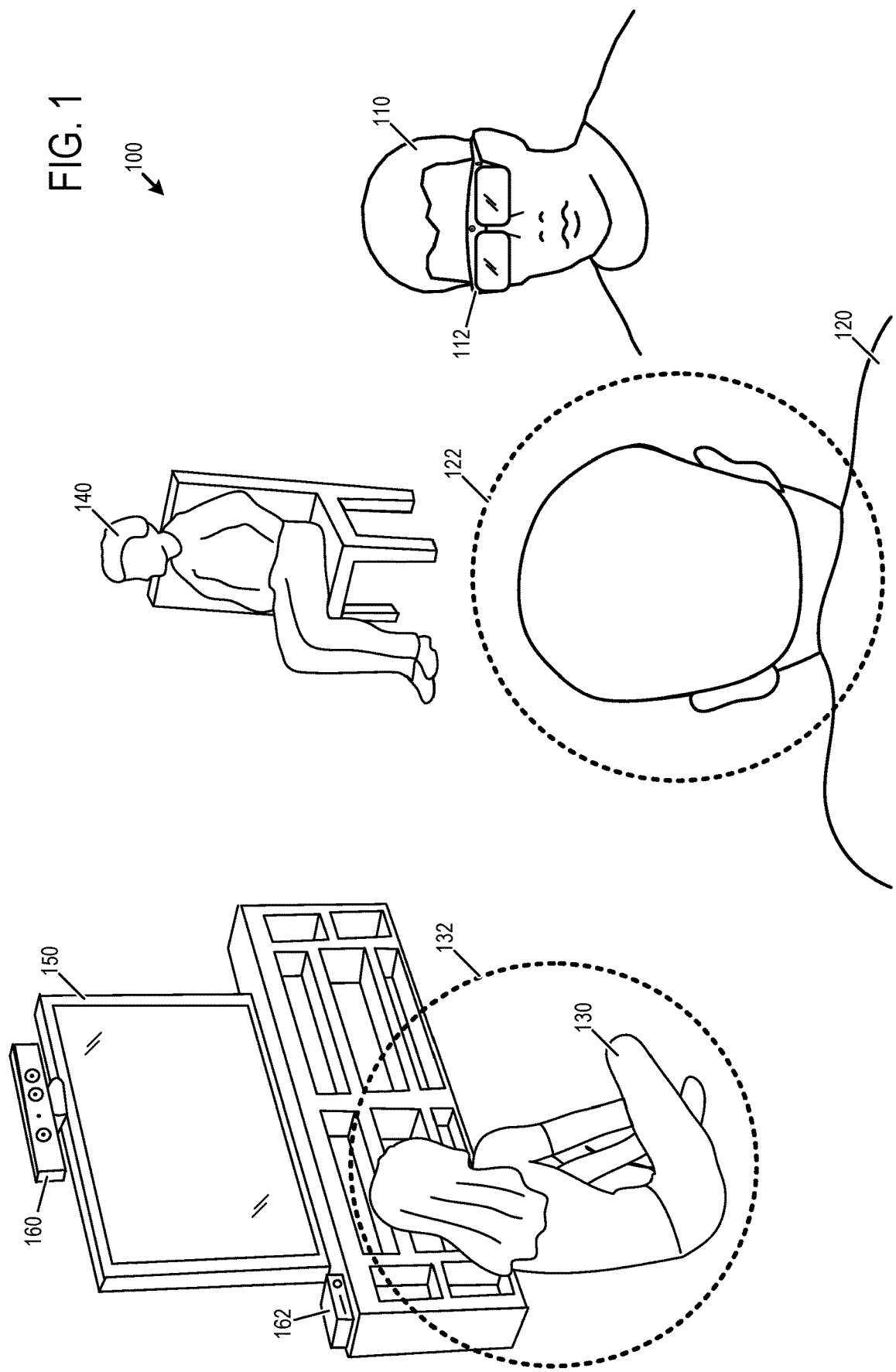
FIG. 1 depicts an example environment in which audio receive beamforming of a mobile microphone array is used with sensor fusion.

Acoustic beamforming with a mobile microphone array presents numerous challenges, due in part to the potential for relative movement between the microphone array and an object targeted for beamforming. As the microphone array is moved through translation or rotation, for example, a beamforming region provided by the array will likewise move unless beamforming parameters, such as the beam vector and/or width are adjusted to account for movement of the microphone array. Furthermore, if an object targeted for beamforming also moves, the beamforming region may no longer cover the object unless the beamforming parameters are adjusted to account for movement of the object. Concurrent movement of both the microphone array and the targeted object is also likely to result in mistargeting of a beamforming region, unless such movement is closely coordinated between the microphone array and targeted object.

Within each of the above scenarios, relative movement of the microphone array and a targeted object is to be detected if adjustment of the beamforming parameters are to be accurately performed. However, adaptive beamforming techniques that rely on detecting a signal of interest in the audio signals captured by the microphone array to optimize targeting of an acoustic source are computationally expensive, prone to lag within the context of movement between the microphone array and the acoustic source, and rely on the presence of the acoustic source within the acoustic signals. If, for example, an acoustic source is intermittent or has not yet occurred, relative movement of the acoustic source will not be detected during a period when the acoustic source is silent or of sufficiently low magnitude.

The above issues associated with acoustic beamforming with a mobile microphone array may be addressed by the use of sensor fusion, incorporating sensor data from inertial sensors and cameras to detect and measure a relative positioning between the microphone array and an object targeted for beamforming. Visual identification of the targeted object and/or the mobile device captured by a camera feed may provide a more accurate and immediate indication of their relative positioning as compared to adaptive techniques that rely on analysis of acoustic signals. Furthermore, the use of inertial sensor measurements may provide a computationally more efficient technique for observing movement of the microphone array as compared to visual identification techniques that rely on image analysis and/or adaptive techniques that rely on acoustic analysis.

As described in more detail below, in some examples a mobile device, such as a head-mounted display (HMD) device uses video and sensor fusion to determine its real-time location in a shared coordinate space. A user of the mobile device may select an object to target within the surrounding environment or load a previously stored list of audio sources within the environment. Audio produced from the locations of these audio sources or targeted objects may be enhanced or suppressed through audio receive beamforming of a microphone array located on-board the mobile device.

In some examples, machine learning and/or sharing of data among peer devices of the mobile device may be used to further identify audio sources of special interest within the environment. Further, the user may be prompted by the mobile device to determine whether audio sources within the environment are to be selectively enhanced or suppressed.

In some examples, the mobile device may share positioning data of itself and the location of audio sources within the environment with peer device or a cloud-based service for distributed sharing. In such examples, the mobile device may selectively request and obtain real-time location updates for a tracked object from other devices, such as if the tracked object moved outside the field of view of a camera or is obscured by another object within the environment. Coordinated location updates may be provided to the mobile device from an entity tracking cloud-based service or from a peer to peer connection with other peer devices, game consoles, or other sensors within the environment.

The mobile device calculates real-time relative vectors toward the location of the targeted objects, and forms adaptive audio beams to obtain isolated audio from each source, even as the mobile device moves within the environment. The isolated audio from each of the audio beams may be processed to enhance or suppress the isolated audio within the resulting processed audio. The processed audio may be reproduced to the user of the mobile device (e.g., via headphones) or may be provided to another process, such as an automated speech recognizer. Video and/or sensor processing may be off-boarded by the mobile device to a remote service, if network bandwidth usage and network latencies are acceptable for a given use case. These and other examples of receive audio beamforming with a mobile microphone array using sensor fusion are described in further detail below.

FIG. 1 depicts an example environment 100 in which audio receive beamforming of a mobile microphone array is used with sensor fusion. Within environment 100, a user 110 is wearing a head mounted display (HMD) device 112, as an example of a mobile device. HMD device 112 includes a microphone array, and may further include one or more inertial sensors, geo-positioning sensors, and/or forward-facing cameras. Environment 100 further includes other objects, which are potential audio sources, such as persons 120, 130, 140, and a television 150. Furthermore, in this example, a camera system 160 that is remotely located from HMD device 112 images the environment via one or more of its cameras. A computing device 162 interfacing with camera system 160 is also located within the environment. In an example, camera system 160 may be located on-board a peer HMD device or other mobile device of another user.

Cameras of HMD device 112 and/or camera system 160 capture respective camera feeds of the environment from which the respective locations of user 110, persons 120, 130, 140, and television 150 may be determined. HMD device 112 and/or camera system 160 may include a combination of depth cameras, infrared cameras, visible light cameras, etc. Camera feeds may be processed on-board HMD device 112 or off-board the HMD device by another computing device. In an example, camera feeds captured by one or more cameras located on-board HMD device 112 may be processed locally to determine a location or positioning of objects within the environment. In another example, camera feeds captured by cameras located off-board HMD device 112 (e.g., camera system 160) may be processed off-board the HMD device by computing device 162 or a cloud service remotely located from the environment to determine a location or positioning of objects within the environment, including HMD device 112. Cameras feeds or positioning data obtained from the camera feeds of off-board cameras may be provided to HMD device 112 over a wireless communications network. Inertial sensors of HMD device 112 may enable the HMD device to determine or further refine a determination of its positioning (i.e., location and orientation) within the environment.

Beamforming may be selectively performed using the microphone array of HMD device 112 in combination with camera and/or inertial sensor data to emphasize or de-emphasize audio sources within the environment. For example, user 110 may be engaged in a conversation with person 120, and therefore user 110 would like to emphasize the sound of that person's voice. Audio receive beamforming of the microphone array of HMD device 112 may be used to emphasize sound in the vicinity of person 120 by directing a beamforming region 122 at a location of person 120 that increases a signal-to-noise (SNR) ratio of an audio source within the beamforming region. The beamformed audio captured via the microphone array of HMD device 112 may be reproduced to user 110 via an audio speaker, such as a pair of headphones or near-ear speakers of the HMD device. Text representations of the speech of person 120 within the beamformed audio captured via the microphone array of HMD device 112 may be displayed to user 110 via a near-eye display of the HMD device.

While user 110 is engaged in the conversation with person 120, person 130 may be speaking loudly to another person 140 to be heard over the sound of television 150. User 110 may desire to de-emphasize the sound of person 130, without de-emphasizing the sound of television 150. Audio receive beamforming of the microphone array of HMD device 112 may be used to de-emphasize sound in the vicinity of person 130 by directing a suppression beamforming region 132 at a location of person 130 that reduces a signal-to-noise ratio of an audio source within the suppression beamforming region. For example, HMD device 112 may include or be used in combination with wired or wireless noise cancelling headphones, such as those incorporating certified Noise Reduction Rating (NRR) hearing protection, to effectively suppress particular audio sources within an environment. Accordingly, beamformed audio reproduced to user 110 via an audio speaker of the HMD device may further attenuate the sound of person 130 as a result of suppression beamforming region 132 being directed at person 130.

Objects may be identified as candidates for beamforming in a variety of ways. In an example, a user may select trackable objects via a physical, graphical, or natural user interface of an HMD device or other mobile device. In another example, a user of an HMD device or other mobile device may load a stored list of objects and their respective locations previously identified within the environment by the user's device or by another device (e.g., peer device). This stored list may be provided to the mobile device from a cloud-based service, in an example. In some examples, machine learning may be used to automatically identify objects that correspond to audio sources of special interest (e.g., loud machinery or people) through use of camera feeds, and the user may be prompted to identify whether each audio source should be suppressed or enhanced through beamforming of the microphone array.

User 110 may operate HMD device 112 to concurrently apply any suitable quantity of beamforming regions to objects targeted by the user having identified locations within the environment. As user 110 or the targeted objects move within the environment, the positioning of the microphone array of the HMD device relative to the targeted objects is identified based on sensor data obtained from inertial sensors on-board the HMD device and cameras located on-board or off-board the HMD device. Beamforming parameters for each of a plurality of concurrent beamforming regions may be adjusted in real-time by HMD device 112 to maintain coverage of targeted objects as their relative positioning changes with respect to the HMD device.

Figure 2:
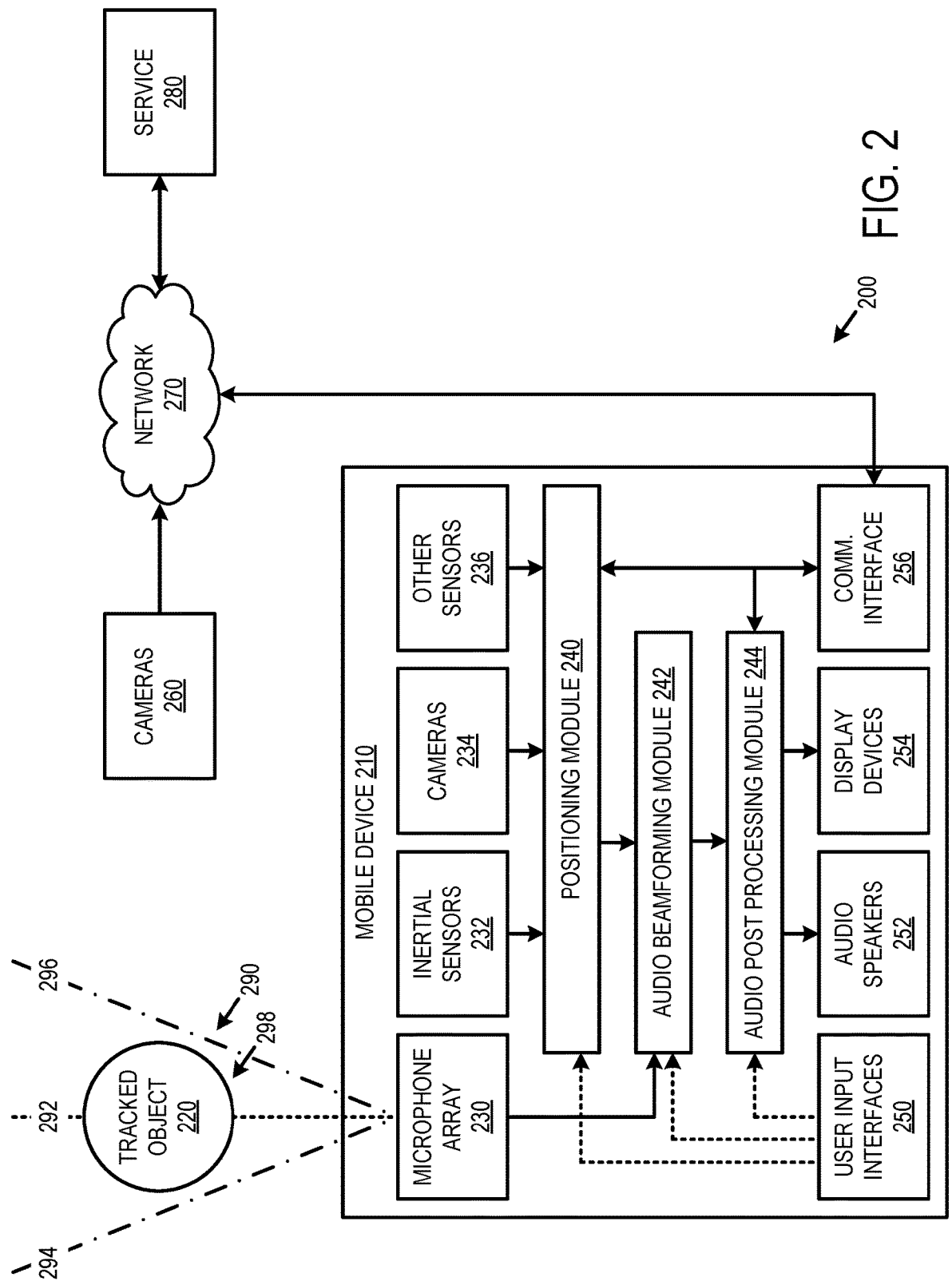
FIG. 2 is a schematic diagram depicting an example processing pipeline for audio receive beamforming of a mobile microphone array with sensor fusion.

FIG. 2 is a schematic diagram depicting an example processing pipeline 200 for audio receive beamforming of a mobile microphone array with sensor fusion. In FIG. 2, a mobile device 210 is beamforming with respect to a targeted object 220 using a microphone array 230 that is located on-board the mobile device. Microphone array 230 includes a plurality of microphones that are spatially distributed in one, two, or three dimensions relative to each other. HMD device 112 of FIG. 1 is an example of mobile device 210. Mobile device 210 may have one or more additional sensors, including a set of one or more inertial sensors 232, a set of one or more cameras 234, and other sensors 236. Other sensors 236 may include geo-positioning sensors that enable mobile device 210 to determine its geo-location and/or orientation. Examples of geo-positioning sensors include a magnetometer that provides a compass heading, an altimeter that provides an indication of altitude relative to a reference, and wireless receivers and associated electronic components supporting GPS or other geo-positioning techniques that rely on terrestrial base stations.

Targeted object 220 may be captured within a camera feed via one or more of cameras 234 of mobile device 210. Additionally or alternatively, targeted object 220 may be captured in a camera feed via a set of one or more cameras 260 located off-board the mobile device 210. In an example, image data representing the camera feed captured via cameras 260 may be remotely processed by a service 280 implemented by a remote computing device, which in turn provides positioning data indicating a location of targeted object 220 to mobile device 210 over a communications network 270. As a more specific example, mobile device 210 and cameras 260 each may provide sensor data to service 280. Service 280 may transform the data received to a common coordinate system to form a mesh or point cloud representation of the use environment, and identify objects of interest in the use environment, such as targeted object 220 and mobile device 210. Then, service 280 may share the mesh or point cloud, and provide updated coordinates to mobile device 210 regarding the location of targeted object 220 and the mobile device 210 as those objects move within the use environment. In other examples, image data may be provided by off-board cameras 260 to mobile device 210 for such analysis. Mobile device 210 may communicate with other devices over communications network 270 via a communications interface 256.

Sensor-based data obtained from one or more of microphone array 230, inertial sensors 232, on-board cameras 234, other sensors 236, off-board cameras 260, and/or service 280 may be processed by one or more modules of mobile device 210. These modules may form part of an individual computer program or may be distributed across multiple computer programs. A positioning module 240 of mobile device 210 may determine a positioning of the mobile device relative to targeted object 220 using a combination of inertial sensor data and/or positioning data obtained from camera feeds of cameras 234 and/or 260. In an example, a positioning of mobile device 210 may be identified in six degrees-of-freedom (6DOF) (e.g., by respective values for x, y, z, roll, pitch, yaw) within a coordinate system. Similarly, a positioning of targeted object 220 may be identified in 6DOF with respect to a coordinate system. However, a location of targeted object 220 represented in 3DOF or 2DOF may be sufficient for beamforming implementations that do not account for orientation of the targeted object. Positioning module 240 may convert positioning data of mobile device 210 or targeted object 220 into a common or shared coordinate system from which a relative positioning of the mobile device with respect to the targeted object may be determined by the positioning module.

Positioning module 240 outputs one or more beamforming parameters based on the positioning of mobile device 210 relative to targeted object 220. Examples of these parameters may include a beam vector and a beam width. In an example, positioning module 240 determines a beam vector 292 as originating at mobile device 210 (e.g. at its microphone array 230) and intersecting the identified location of targeted object 220, and a beam width (depicted between lines 294 and 296) surrounding the beam vector based on a distance between the mobile device and the targeted object. For example, the beam width may be narrowed as the targeted object 220 moves further from mobile device 210, and may be widened as the targeted object moves closer to the mobile device. Beam width may be represented as an angle in two or three-dimensions that originates at the microphone array, for example. Additionally or alternatively, the beam width may be based on a proximity of the targeted object to another targeted object (e.g., an audio source thereof) and/or a proximity of the beamformed region to another beamformed region. An example of beamform width adjustment is described in further detail with reference to FIGS. 5D and 5E.

Audio beamforming module 242 receives the beamforming parameters as input to a beamforming function. In an example, audio beamforming module 242 includes one or more beamformers having associated filters that may be selectively applied, including a time delay beamformer, Frost beamformer, MVDR beamformer, LCMV beamformer, etc. Audio beamforming module 242 may be included as part of one or more audio drivers associated with the microphone array, in an example. A set of audio signals obtained via microphone array 230 are processed by audio beamforming module 242 by applying the beamforming function to the set of audio signals using the beamforming parameters to obtain a set of processed audio signals. In the example depicted in FIG. 2, audio receive beamforming indicated at 290 is performed with respect to targeted object 220 in which beam vector 290 and beam width (depicted between lines 294 and 296) define a beamforming region 298 that contains targeted object 220.

Audio beamforming module 242 outputs the set of processed audio signals, which may be post processed by an audio post processing module 244 as described in further detail with reference to FIG. 4. Briefly, however, processed audio signals may be reproduced via one or more audio speakers 252 of mobile device 210, analyzed for speech that is converted to text that is displayed via one or more display devices 254 of the mobile device 210, and/or transmitted as audio or a text representation of the audio to a remote computing device via communications interface 256, as examples of post processing.

A user may control operation of positioning module 240, audio beamforming module 242, and/or audio post processing module 244 via one or more user input interfaces 250 of mobile device 210. For example, positioning module 240 may be controlled by a user selecting a targeted object from among a plurality of trackable objects at which a beamforming region is to be directed. Audio beamforming module 242 may be controlled by a user manually defining the beam vector and/or beam width of a beamforming region, or by identifying the beamforming region as a beamforming region that emphasizes an audio source or a suppression beamforming region that de-emphasizes the audio source, as examples. Audio post processing module 244 may be controlled by a user selecting post processing options or modes of operation to be applied to the set of processed audio signals, as examples. User input interfaces 250 may include physical interfaces (e.g., touch-screen, controller, button, etc.) and natural user interfaces (e.g., voice, eye, and/or gesture controlled, etc.).

Figure 3:
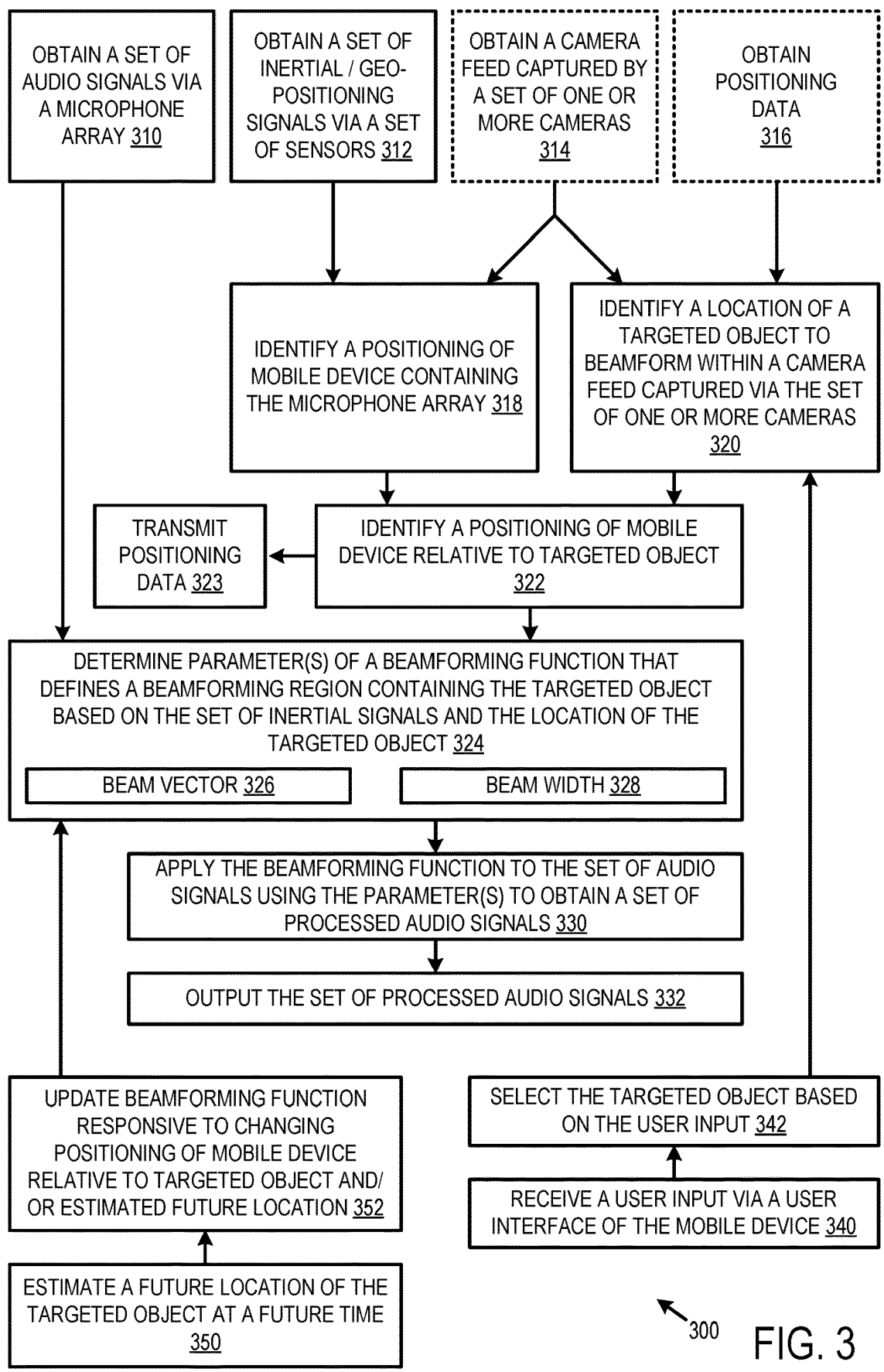
FIG. 3 is a flow diagram depicting an example method for audio receive beamforming of a mobile microphone array with sensor fusion.

FIG. 3 is a flow diagram depicting an example method 300 for audio receive beamforming of a mobile microphone array with sensor fusion. Method 300 may be performed by a computing system, which may comprise a mobile device (e.g., HMD device 112 of FIG. 1 or mobile device 210 of FIG. 2) that performs some or all of the operations of method 300. Alternatively or additionally, the computing system may include an on-premises computing device (e.g., device 162 of FIG. 1) that is located within environment of the mobile device that performs some or all of the operations of method 300. Alternatively or additionally, the computing system may include one or more computing devices remotely located from the environment, such as a server system that hosts a service (e.g., service 280 of FIG. 2) that performs some or all of the operations of method 300.

At 310, the method includes obtaining a set of audio signals via a microphone array of a mobile device. The microphone array includes a plurality of microphones that are spatially distributed relative to each other, such as previously described with reference to microphone array 230 of FIG. 2.

According to method 300, a relative positioning of the mobile device having the microphone array is determined at 322 with respect to a targeted object based on data obtained from a variety of sources at 310, 312, 314, and/or 316. These sources may include sensors located on-board the mobile device, such as one or more inertial sensors and/or cameras of the mobile device. Additionally or alternatively, these sources may include remotely located computing devices and/or sensors located off-board the mobile device.

In a first example implementation, the mobile device determines its relative positioning with respect to the targeted object based on sensor data obtained from sensors located on-board the mobile device. For example, the mobile device obtains a set of inertial signals and/or geo-positioning signals via a set of one or more inertial sensors and/or geo-positioning sensors at 312, obtains a set of camera feeds via a set of one or more cameras at 314, determines its positioning within a coordinate system based on the inertial/geo-positioning signals and/or camera feeds at 318, determines a location of the targeted object within the coordinate system at 320 based on the camera feeds, and determines its relative positioning with respect to the targeted object at 322 based on its positioning determined at 318 and the location of the targeted object determined at 320.

In a second example implementation, the mobile device determines its relative positioning with respect to the targeted object based on sensor data obtained from sensors located on-board the mobile device, and further based on sensor data obtained from sensors located off-board the mobile device. For example, in addition to the approach described above with respect to the first implementation, some or all of the one or more camera feeds obtained by the mobile device at 314 are from one or more cameras located off-board the mobile device. These off-board cameras capture the targeted object and potentially the mobile device within the camera feeds. The mobile device determines its positioning within a coordinate system based on the inertial/geo-positioning signals and/or camera feeds at 318, determines a location of the targeted object within the coordinate system at 320 based on the camera feeds, and determines its relative positioning with respect to the targeted object at 322 based on its positioning determined at 318 and the location of the targeted object determined at 320.

In a third example implementation, the mobile device determines its relative positioning with respect to the targeted object based on positioning data provided to the mobile device from a remote computing device that indicates a location of the targeted object, and further based on sensor data obtained from sensors located on-board and/or off-board the mobile device. As described above with respect to the first and second implementations, the mobile device determines its positioning within a coordinate system based on the inertial/geo-positioning signals and/or camera feeds at 318. The mobile device determines the location of the targeted object at 320 based on the positioning data obtained from the remote computing device at 316. The positioning data obtained at 316 for the targeted object may be represented within a different coordinate system than the positioning of the mobile device determined at 318. The mobile device may translate the positioning data obtained at 316 into the coordinate system of the positioning of the mobile device determined at 318 to determine a relative positioning of the mobile device with respect to the targeted object at 322. In an example, a service that is remotely located from the mobile device processes camera feeds to determine positioning data for the targeted object, which may be provided to the mobile device over a wired or wireless communications network, such as previously described with reference to service 280 of FIG. 2. As another example, an on-premises computing device located within the environment processes the camera feeds to determine positioning data for the targeted object, which may be provided to the mobile device over a wired or wireless communications network.

In a fourth example implementation, a relative positioning of the mobile device with respect to the targeted object is determined off-board the mobile device by another computing device, and the mobile device obtains positioning data from the computing device that indicates the relative positioning. For example, the mobile device and the targeted object may be observed within one or more camera feeds captured by one or more cameras located off-board the mobile device. In an example, a service that is remotely located from the mobile device processes camera feeds to determine positioning data for the targeted object and the mobile device, which may be provided to the mobile device over a wired or wireless communications network, such as previously described with reference to service 280 of FIG. 2. As another example, an on-premises computing device located within the environment processes the camera feeds to determine positioning data for the targeted object and the mobile device, which may be provided to the mobile device over a wired or wireless communications network. The positioning data obtained at 316 by the mobile device may indicate the relative positioning determined at 322. The mobile device may translate the positioning data obtained at 316 from a global coordinate system to a local coordinate system of the mobile device for the microphone array and beamforming module. The mobile device may refine the positioning data obtained at 316 based on inertial signals obtained via one or more inertial sensors at 312 to determine the relative positioning at 322.

Where the mobile device includes a set of one or more inertial sensors, the microphone array and the set of inertial sensors have a shared coordinate system, thereby enabling movement of the microphone array to be observed in the inertial signals. The set of inertial sensors may include a six-axis inertial sensor system or inertial measurement unit (IMU) that measures acceleration and/or orientation in 6DOF. Hence, the set of inertial sensors enables a positioning (e.g., a location and an orientation) of a mobile device to be determined in three-dimensional space. Further, as part of operation 312, mobile device may receive geo-positioning signals via geo-positioning sensors of the mobile device that provides additional measurements of geo-location and/ or orientation, such as previously described with reference to sensors 236 of FIG. 2. For example, the mobile device may determine its geo-location via GPS and/or with reference to one or more terrestrial base stations, and may determine its orientation via a magnetometer.

Where one or more cameras reside on-board the mobile device at a fixed orientation, the cameras have a shared coordinate system with the microphone array and the set of inertial sensors. In this on-board configuration, one or more camera feeds captured by the one or more cameras may be processed by the mobile device to identify a location of the targeted object based on the camera feeds, as described at 320. As previously described with reference to cameras 234 of FIG. 2, the camera feeds may include depth, infrared, and/or visible light camera feeds captured via a plurality of depth, infrared, and/or visible light cameras. Each camera feed may include a plurality of time-sequenced image frames that can be aligned and/or combined with other camera feeds on a frame by frame basis to enable coordinated analysis of depth, infrared, and/or visible light features. In another example, some or all of the cameras reside off-board the mobile device. Cameras residing off-board the mobile device may image an environment containing the targeted object and/or the mobile device.

In an example, the positioning of the mobile device identified at 318 may include location and orientation in six-degrees of freedom, including its x, y, z location and its roll, pitch, yaw orientation within a coordinate system of the mobile device. The positioning of the mobile device may be identified based on the inertial signals obtained at 312 and geo-positioning signals (if available). The positioning of the mobile device may be further identified at 318 based on camera feeds obtained at 314 and/or positioning data obtained at 316 from a remote source. For example, geo-positioning sensors may provide a coarse indication of a location and/or orientation of the mobile device, which may be further refined by the inertial signals obtained via the inertial sensors. Additionally or alternatively, positioning data obtained at 316 may indicate a location and/or an orientation of the mobile device as provided by a service that images the environment containing the mobile device via one or more cameras.

It will be understood that various techniques may be used to determine a positioning of a mobile device relative to a targeted object within a shared coordinate system. Such techniques may include, as examples, simultaneous localization and mapping (SLAM), depth sensing, and three-dimensional modeling of the environment using multiple image frames obtained via one or more cameras to produce a point cloud or mesh of the shared coordinate space. This point cloud or mesh may be used to describe and share positioning data of objects between devices and/or sensors.

At 320, the method includes identify a location of a targeted object to beamform within a camera feed captured via a set of one or more cameras imagining the environment of the mobile device. As described with reference to operation 314, camera feeds may be obtained and processed locally at the mobile device to identify a location of the targeted object. Alternatively or additionally, as described with reference to operation 316, positioning data indicating a location of the targeted object may be obtained from a remote source, such as a service. In an example, machine vision may be applied to individual frames of a camera feed by the mobile device or a remote computing device to identify the targeted object within each of the individual frames. Machine vision may include an object recognition function that identifies the targeted object within individual frames of the camera feed. For example, if the targeted object is a human subject, the object recognition function may include human body classification and/or facial recognition. As another example, the object recognition function may be configured to read QR codes, barcodes, or other visual identifiers located upon an object to identify and track that object. These visual identifiers may be used to authoritatively know that an object is the same object if it moves while a tracking device is not operating or if the object moves between two cameras whose views of the environment do not overlap or are time shifted within the environment.

At 322, the method includes identifying a positioning of the mobile device relative to the targeted object based on the positioning of the mobile device identified at 318 and the location of the targeted object identified at 320. The relative positioning of the mobile device to the targeted object may be identified within 6DOF at 322. However, other suitable representations of relative positioning may be used. For example, the relative positioning identified at 322 may be within a two-dimensional plane that is orthogonal to the gravity vector. In this example, the relative positioning identified at 322 may be represented by an angle measured within the horizontal plane in relation to the mobile device within a range of 0-360 degrees and a distance between the mobile device and the targeted object within the horizontal plane. In another example, the relative positioning identified at 322 may be represented by a combination of a first angle measured within the horizontal plane, a second angle measured within a vertical plane, and a distance between the mobile device and the targeted object. In at least some examples, at 323, the mobile device may transmit, over a communications network, positioning data that identifies the location and/or orientation of itself and/or other objects within the environment to another computing device, such as a peer device or server-implemented service.

At 324, the method includes determining one or more parameters of a beamforming function that defines a beamforming region containing the targeted object. The parameters of the beamforming function determined at 322 may include a beam vector 326 and/or a beam width 328. One or more of these parameters of the beamforming function may be based on the positioning of the mobile device relative to the targeted object as identified at 322. Accordingly, the one or more parameters of the beamforming function may be determined based on the set of inertial signals obtained at 312 and the location of the targeted object captured within a camera feed as identified at 320.

Beam vector 326 may be defined as originating at the microphone array and intersecting the targeted object at the location identified at 320. Beam vector 326 may be represented in two or three-dimensional space. In an example, beam vector 326 may be defined by an angle in a range of 0-360 degrees within a horizontal plane that is orthogonal to the gravity vector. In another example, beam vector 326 may be defined by an angle in the horizontal plane and another angle in a vertical plane.

Beam width 328 may be defined by an angle originating at the microphone array that represents a wedge or conical region surrounding beam vector 326 that forms a central axis of the conical region. Beam width 328 may be represented in two or three-dimensional space. In an example, a beam width of 90 degrees within the horizontal plane would provide 45 degrees of beam width on either side of beam vector 326. Beam width 328 may have the same angle or a different angle in the horizontal plane as compared to a vertical plane. A magnitude of beam width 328 may be based on a distance between the mobile device and the targeted object, and/or a proximity of the targeted object to another audio source. For example, as the distance increases, the beam width may be narrowed; and as the distance decreases, the beam width may be increased. However, in another example, beam width may be constant or may be selected from a set of two or more pre-defined beam widths (e.g., narrow and wide).

At 330, the method includes applying the beamforming function to the set of audio signals using the one or more parameters to obtain a set of processed audio signals. The set of processed audio signals may include one or more audio signals (e.g., mono, stereo, or additional audio channels) that are formed from a spatially filtered combination of the set of audio signals obtained via the microphone array. It will be understood that the example beamforming function described at 324 and 330 may take the form of a beamforming function that defines a beamforming region that enhances audio sources or suppresses audio sources. In the case of a beamforming function that enhances audio sources, the set of processed audio signals increases a signal-to-noise ratio of an audio source within its beamforming region relative to the set of audio signals to which the beamforming function is applied. This increase in signal-to-noise ratio may include or be accompanied by an increase in signal-to-interference-plus-noise (SINR) ratio. In the case of a suppression beamforming function that suppresses audio sources, the set of processed audio signals decreases a signal-to-noise ratio of an audio source within its suppression beamforming region relative to the set of audio signals to which the suppression beamforming function is applied. This decrease in signal-to-noise ratio may include or be accompanied by a decrease in SINR ratio. Isolated audio from any number of beamforming regions may be combined to obtain the processed audio signal output at 332, whereby isolated audio sources to be suppressed may be subtracted from and isolated audio sources to be enhanced may be added to the input audio signals.

At 332, the method includes outputting the set of processed audio signals. The set of processed audio signals may be output in a variety of ways, as described in further detail with reference to FIG. 4. For example, the processed audio signals may be reproduced via an audio speaker of the mobile device, visually presented as text via a display of the mobile device, stored in computer memory, and/or transmitted off-board the mobile device to a remote computer.

In at least some examples, the targeted object may be selected by a user input provided by a user. For example, at 340, the method may further include receiving a user input via a user interface of the mobile device. At 342, the method includes selecting the targeted object based on the user input. The targeted object selected at 342 may be used to determine the location of that targeted object at 320.

In at least some examples, estimates of future locations of a targeted object may be used to update the beamforming function determined at 324. For example, at 350, the method may further include estimating a future location of the targeted object at a future time. The future location may be estimated based on motion of the targeted object observed across individual frames of the camera feed obtained at 314 and/or motion of the targeted object observed in the positioning data obtained at 316.

At 352, the method includes updating the beamforming function responsive to a changing positioning of the mobile device relative to the targeted object determined at 322 and/or the future location of the targeted object estimated at 350. In an example, beam vector 326 and/or beam width 328 of the beamforming function may be varied over time responsive to a change in positioning of the mobile device relative to the targeted object as indicated by the set of inertial signals and/or the location of the targeted object identified within the camera feed. In another example, beam vector 326 and/or beam width 328 may be varied responsive to the future location estimated at 350 prior to or without identifying an updated location of the targeted object within the camera feed at the future time.

In at least some examples, the processing of inertial signals to identify a change in the relative positioning of the mobile device to the targeted object may use less computational resources as compared to processing of image data of a camera feed. Accordingly, updates to a relative positioning of the mobile device to the targeted object may be performed more frequently using inertial signals as compared to the processing of the camera feeds. For example, the mobile device may update the relative positioning at a higher frequency based on the inertial signals and at a lower frequency based on the camera feeds or positioning data reported by a service that analyzes the camera feeds. A future location of the targeted object may be estimated for periods of time between periodic reporting of positioning data by a remote service, for example.

Aspects of method 300 may be performed for each of a plurality of beamforming functions that define respective beamforming regions that enhance and/or attenuate audio sources. Accordingly, the beamforming function describe with respect to method 300 may be one of a plurality of beamforming functions that define respective beamforming regions for a plurality of targeted objects.

FIG. 4 is a schematic diagram depicting an example data relationship 400 in which multiple targeted objects and/or beamforming regions may be represented. A targeted object may be identified by an object identifier, enabling multiple targeted objects to be distinguished from each other by a computing system. FIG. 4 depicts a set of multiple object identifiers 410 of which object identifier 412 is an example. Each object identifier may be associated with positioning data indicating a location of the targeted object attributed to the object identifier and/or a relative positioning of a mobile device to that targeted object. For example, object identifier 412 is associated with positioning data 422 of a set of multiple positioning data items 420 that may be attributed to other object identifiers. Each object identifier may be associated with raw audio data and processed audio data captured via a microphone array. For example, object identifier 412 is associated with processed audio data 452 of a set of multiple audio data items 450 that also includes audio data that may be attributed to other object identifiers. Processed audio data 452 is an example of the set of processed audio signals output at operation 332 of FIG. 3. Each object identifier may be associated with a beamform identifier representing a beamforming function for the targeted object attributed to the object identifier. For example, object identifier 412 is associated with beamform identifier 432 of a set of multiple beamform identifiers 430 that may be attributed to other targeted objects. Each beamform identifier may be associated with beamforming parameters of its beamforming function, such as a beam vector and/or a beam width. For example, beamform identifier 432 is associated with beamforming parameters 442 of a set of multiple beamforming parameters 440 that may be attributed to other beamform identifiers.

The above described data relationship may enable a variety of post processing functions with respect to audio data captured via the microphone array. As examples, processed audio data 452 may be reproduced via an audio speaker 460, stored in computer storage 462, further processed by voice activity detection (VAD) 464 to identify the presence of human speech within processed audio data 452, converted from processed audio data 452 to text via speech-text conversion of speech recognition 466, etc. Text representations of processed audio data 452 output by speech-text conversion may be presented via a display device 468. Output of VAD 464, speech recognition 466, and other post processing may be stored in storage 462 in association with its object identifier (e.g., object ID 412). In at least some examples, VAD 464 may be used to determine which object was an audio source within the processed audio, enabling an object identifier of that object to be associated with the processed audio. For example, VAD 464 may be used to determine that a particular person identified by an object identifier was an audio source within the processed audio. Processed audio data and/or converted forms thereof may be transmitted off-board the mobile device to a remote computing device 470 over a communication network.

Figure 5A:
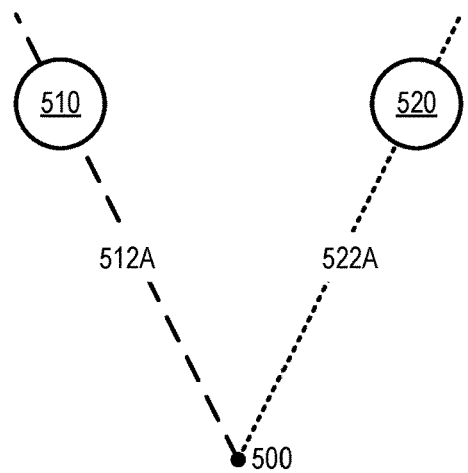
FIGS. 5A-5F are schematic diagrams depicting example use scenarios involving multiple targeted objects.
Figure 5B:
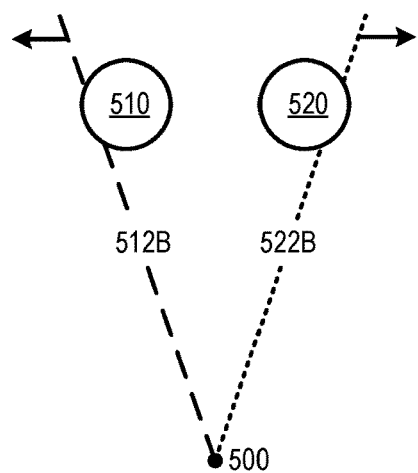

As previously described with reference to FIGS. 3 and 4, multiple beamforming regions may be concurrently provided by the use of two or more beamforming functions having respective beamforming parameters. FIG. 5A depicts an example in which a mobile device 500 is beamforming with respect to two targeted objects 510 and 520 using beamforming vectors 512A and 522A.

Where two or more beamforming functions are concurrently provided, collision avoidance between the two or more beamforming regions may be performed as part of operation 352 of FIG. 3. In an example, upon two targeted objects approaching each other, the method at 352 may include adjusting a beam vector and/or a beam width of at least one of the respective beamforming regions away from at least another of the respective beamforming regions. This adjustment to the beam vector and/or beam width may be performed to maintain at least a minimum threshold distance between the beamforming regions and/or to reduce overlap between the beamforming regions. FIG. 5B depicts an example of collision avoidance between targeted objects 510 and 520 that are approaching each other in which mobile device 500 adjusts beam vectors 512B and 522B away from each other as compared to the relative position of targeted objects 510 and 520.

Figure 5C:
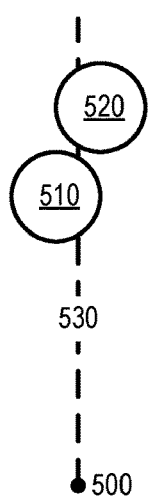

As an alternative to collision avoidance, two or more beamforming regions may be merged as part of operation 352 of FIG. 3. In an example, upon two of the plurality of beamforming regions intersecting with each other, the method at 352 may include combining the two or more beamforming regions into a shared beamforming region containing their respective targeted objects. This shared beamforming region may be defined by an individual beamforming function. FIG. 5C depicts an example in which beam vectors 512A and 522A of FIG. 5A have been merged into a common beam vector 530 used to beamform both of targeted objects 510 and 520.

Figure 5D:
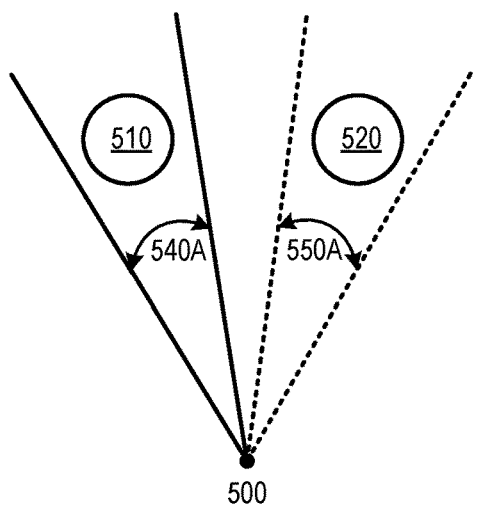
Figure 5E:
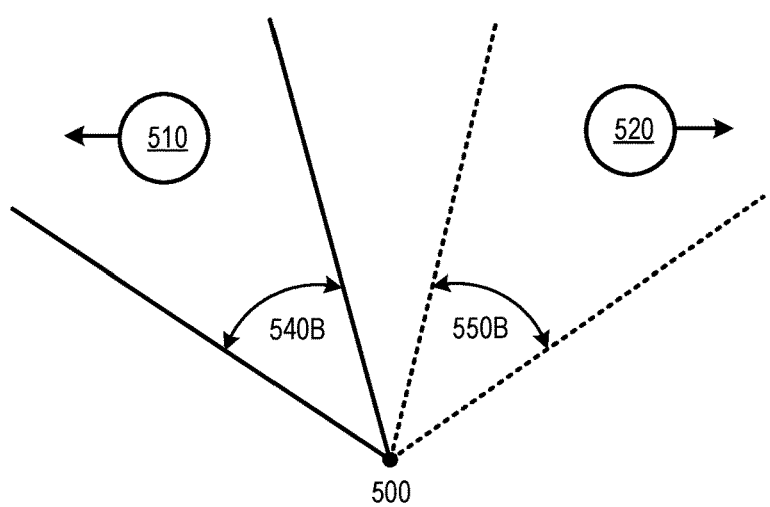

FIG. 5D depicts an example in which mobile device 500 is beamforming targeted objects 510 and 520 with beamforming regions having beamform widths 540A and 550A, respectively. In FIG. 5E, targeted objects 510 and 520 move apart from each other as compared to FIG. 5D, thereby decreasing their proximity to each other. In response to this increase in proximity, beamforming widths 540B and 550B of FIG. 5E may be increased as compared to beamforming widths 540A and 550A depicted in FIG. 5D. This approach may be performed in reverse to reduce beamform width as targeted objects 510 and 520 move toward each other and increase their proximity to each other.

Figure 5F:
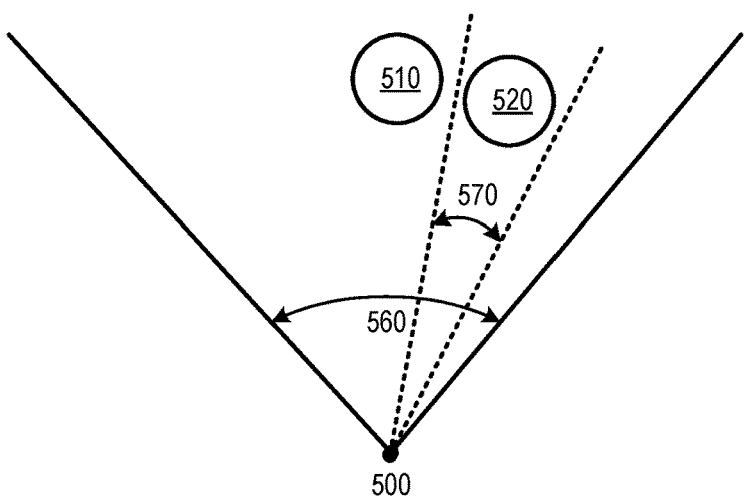

FIG. 5F depicts an example in which mobile device 500 is beamforming targeted object 510 with a first beamforming region having a relatively wide beamform width 560, and also beamforming targeted noise source 520 with a second beamforming region having a relatively narrow beamform width 570. In this example, noise source 520 and the second beamforming region having the relatively narrow beamform width 570 are located within the first beamforming region having the relatively wide beamform width 560. Audio originating from noise source 520 may be subtracted from audio originating from targeted object 510 captured by the first beamforming region, to thereby emphasize audio originating from targeted object 510 and suppress audio originating from noise source 520. The relatively wide beamform width 560 may be 180-360 degrees within a plane surrounding mobile device 500, as an example. However, other suitable beamform widths may be used.

In at least some examples, the methods and processes described herein may be tied to a computing system of one or more computing devices. In particular, such methods and processes may be implemented as a computer-application program or service, an application-programming interface (API), a library, and/or other computer-program product.

Figure 6:
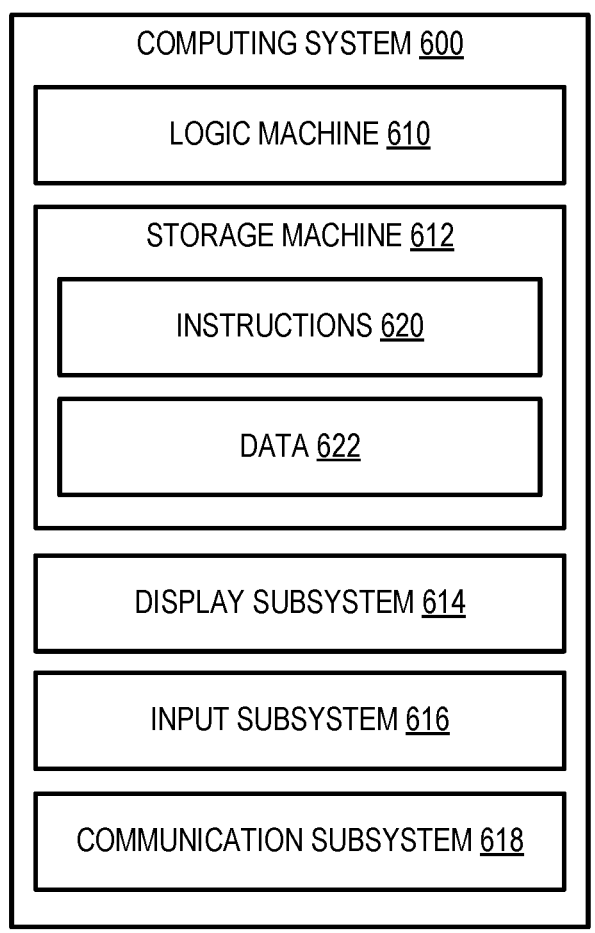
FIG. 6 is a schematic diagram depicting an example computing system.

FIG. 6 schematically shows an example of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), wearable devices (e.g., HMD device) and/or other computing devices.

Computing system 600 includes a logic machine 610 and a storage machine 612. Computing system 600 may optionally include a display subsystem 614, input subsystem 616, communication subsystem 618, and/or other components not shown in FIG. 6.

Logic machine 610 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 612 includes one or more physical devices configured to hold instructions 620 executable by the logic machine and/or other forms of data 622 to implement the methods and processes described herein. When such methods and processes are implemented, the state of storage machine 612 may be transformed—e.g., to hold different data. The buffers described herein may be included or defined within storage machine 612.

Storage machine 612 may include removable and/or built-in devices. Storage machine 612 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 612 may include volatile, nonvolatile, dynamic, static, read/write, read-only, random-access, sequential-access, location-addressable, file-addressable, and/or content-addressable devices.

It will be appreciated that storage machine 612 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 610 and storage machine 612 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" may be used to describe an aspect of computing system 600 implemented to perform a particular function. In some cases, a module or program may be instantiated via logic machine 610 executing instructions held by storage machine 612. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 614 may be used to present a visual representation of data held by storage machine 612. This visual representation may take the form of a graphical user interface (GUI). As an example, a GUI of an HMD device may include a three-dimensional spatial GUI (e.g., holographic GUI), such as where three-dimensional audio and three-dimensional tracking of objects is supported. As the herein described methods and processes change the data held by the storage machine, and thus transform the state of the storage machine, the state of display subsystem 614 may likewise be transformed to visually represent changes in the underlying data. Display subsystem 614 may include one or more display devices utilizing virtually any type of technology. Such display devices may be combined with logic machine 610 and/or storage machine 612 in a shared enclosure (e.g., an HMD device, mobile device, tablet computer, etc.), or such display devices may be peripheral display devices.

When included, input subsystem 616 may comprise or interface with one or more input devices such as a sensor or a user input device (e.g., a keyboard, mouse, touch screen, or game controller). In at least some examples, the input subsystem may comprise or interface with selected natural user input (NUI) componentry. Such componentry may be integrated or peripheral, and the transduction and/or processing of input actions may be handled on- or off-board. Example NUI componentry may include a microphone array (e.g., for speech detection by VAD, and speech recognition); an infrared, color, stereoscopic, and/or depth camera for machine vision and/or gesture recognition; a head tracker, eye tracker, body tracker, inertial sensor (e.g., accelerometer or gyroscope), and/or magnetometer/compass for motion detection and/or intent recognition; as well as electric-field sensing componentry for assessing brain activity.

When included, communication subsystem 618 may be configured to communicatively couple computing system 600 with one or more other computing devices. Communication subsystem 618 may include wired and/or wireless communication devices compatible with one or more different communication protocols. As examples, the communication subsystem may be configured for communication via a wireless telephone network, or a wired or wireless local- or wide-area network. In at least some examples, the communication subsystem may allow computing system 600 to send and/or receive messages to and/or from other devices via a network such as the Internet.

Another example provides a computing system for audio receive beamforming, comprising a logic machine, and a storage machine having instructions stored thereon executable by the logic machine to obtain a set of audio signals via a microphone array of a mobile device, obtain a set of inertial signals via a set of inertial sensors of the mobile device, the microphone array and the set of inertial sensors having a shared coordinate system, identify a location of a targeted object to beamform within a camera feed captured via a set of one or more cameras imagining an environment of the mobile device, determine a parameter of a beamforming function that defines a beamforming region containing the targeted object based on the set of inertial signals and the location of the targeted object, the parameter including at least a beam vector originating at the microphone array and intersecting the targeted object, apply the beamforming function to the set of audio signals using the parameter to obtain a set of processed audio signals that increases a signal-to-noise ratio of an audio source within the beamforming region relative to the set of audio signals, and output the set of processed audio signals. In such an example, a camera of the set of one or more cameras may additionally or alternatively reside on-board the mobile device, and has the shared coordinate system with the microphone array and the set of inertial sensors, and the camera feed may additionally or alternatively be processed by the mobile device. In such an example, the mobile device may additionally or alternatively include a head mounted display (HMD) device. In such an example, a camera of the set of one or more cameras may additionally or alternatively reside off-board the mobile device, and the instructions may additionally or alternatively be executable by the logic machine to obtain positioning data representing a location of the targeted object at the mobile device from a remote computing device via a wireless communications network. In such an example, the targeted object may additionally or alternatively be selected by a user input received via a user interface of the mobile device. In such an example, the set of one or more cameras may additionally or alternatively include a depth camera and/or an infrared camera. In such an example, the instructions may additionally or alternatively be executable by the logic machine to apply machine vision to individual frames of the camera feed to identify the targeted object within each of the individual frames, the machine vision additionally or alternatively including an object recognition function that identifies the targeted object within individual frames of the camera feed. In such an example, the targeted object may additionally or alternatively be a human subject, and the object recognition function may additionally or alternatively include human body classification and/or facial recognition. In such an example, the instructions may additionally or alternatively be executable by the logic machine to determine an additional parameter of the beamforming function based on the set of inertial signals and the location of the targeted object, the additional parameter additionally or alternatively including a beam width surrounding the beam vector, wherein the beamforming function may additionally or alternatively be applied to the set of audio signals using the additional parameter to obtain the set of processed audio signals, wherein the beam width may additionally or alternatively be based on a distance of the location of the targeted object to the microphone array and/or a proximity of the targeted object to another audio source. In such an example, the instructions may additionally or alternatively be executable by the logic machine to vary one or more of the beam vector and/or beam width over time responsive to a change in positioning of the mobile device relative to the targeted object as indicated by the set of inertial signals and/or the location of the targeted object identified within the camera feed. In such an example, the instructions may additionally or alternatively be executable by the logic machine to estimate a future location of the targeted object at a future time based on motion of the targeted object observed across individual frames of the camera feed, and vary one or more of the beam vector and/or a beam width responsive to the future location prior to identifying an updated location of the targeted object within the camera feed at the future time. In such an example, the instructions may additionally or alternatively be executable by the logic machine to reproduce the set of processed audio signals via an audio speaker of the mobile device, store an identifier of the targeted object with the set of processed audio signals in a memory device, and convert human speech contained within the set of processed audio signals to text. In such an example, the beamforming function may additionally or alternatively be one of a plurality of beamforming functions that define respective beamforming regions for a plurality of targeted objects, and the instructions may additionally or alternatively be executable by the logic machine to, upon two of the plurality of targeted objects approaching each other, adjust a beam vector and/or a beam width of at least one of the respective beamforming regions away from at least another of the respective beamforming regions to maintain a threshold distance between the respective beamforming regions and/or reduce overlap between the respective beamforming regions. In such an example, the beamforming function may additionally or alternatively be one of a plurality of beamforming functions that define respective beamforming regions for a plurality of targeted objects, and the instructions may additionally or alternatively be executable by the logic machine to, upon two of the plurality of beamforming regions intersecting with each other, combine the two or more beamforming regions into a shared beamforming region containing their respective targeted objects. In such an example, the instructions may additionally or alternatively be executable by the logic machine to identify a location of a targeted exclusion region within the environment of the mobile device within the camera feed, determine a parameter of a suppression beamforming function that defines a suppression beamforming region containing the targeted exclusion region based on the set of inertial signals and the location of the targeted exclusion region, the parameter including one or more of a beam vector and/or a beam width, and apply the suppression beamforming function to the set of audio signals using its parameter, in combination with the beamforming function, to further attenuate an audio source within the suppression beamforming region.

Another example provides a head mounted display (HMD) device supporting audio receive beamforming, the device comprising a microphone array, a set of inertial sensors, a set of one or more forward-facing cameras, a logic machine, and a storage machine having instructions stored thereon executable by the logic machine to obtain a set of audio signals via the microphone array, obtain a set of inertial signals via the set of inertial sensors, obtain a camera feed captured via the set of one or more forward-facing cameras, identify a location of a targeted object to beamform within the camera feed relative to a coordinate system of the HMD device, determine a parameter of a beamforming function that defines a beamforming region containing the targeted object based on the set of inertial signals and the location of the targeted object, the parameter including at least a beam vector originating at the HMD device and intersecting the targeted object, apply the beamforming function to the set of audio signals using the parameter to obtain a set of processed audio signals that increases a signal-to-noise ratio of an audio source within the beamforming region relative to the set of audio signals, and output the set of processed audio signals. In such an example, the instructions may additionally or alternatively be executable by the logic machine to determine an additional parameter of the beamforming function based on the set of inertial signals and the location of the targeted object, the additional parameter additionally or alternatively including a beam width surrounding the beam vector, and the beam width additionally or alternatively based on a distance of the location of the targeted object to the microphone array and/or a proximity of the targeted object to another audio source. In such an example, the instructions may additionally or alternatively be executable by the logic machine to reproduce the set of processed audio signals via an audio speaker of the HMD device, store an identifier of the targeted object with the set of processed audio signals in the storage device, and convert human speech contained within the set of processed audio signals to text displayed via a display device of the HMD device.

Another example provides a method performed by a computing system for audio receive beamforming, comprising obtaining a set of audio signals via a microphone array of a mobile device, obtaining a set of inertial signals via a set of inertial sensors of the mobile device, the microphone array and the set of inertial sensors having a shared coordinate system, identifying a location of a targeted object to beamform within a camera feed captured via a set of one or more cameras imaging an environment of the mobile device, determining a parameter of a beamforming function that defines a beamforming region containing the targeted object based on the set of inertial signals and the location of the targeted object, the parameter including at least a beam vector originating at the microphone array and intersecting the targeted object, applying the beamforming function to the set of audio signals using the parameter to obtain a set of processed audio signals that increases a signal-to-noise ratio of an audio source within the beamforming region relative to the set of audio signals, and outputting the set of processed audio signals to the mobile device. In such an example, the set of one or more cameras may additionally or alternatively include one or more of a depth camera and/or an infrared camera residing on-board the mobile device, and the set of one or more cameras, the microphone array, and the set of inertial sensors may additionally or alternatively have the shared coordinate system.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for audio receive beamforming, comprising:
   a logic machine; and
   a storage machine having instructions stored thereon executable by the logic machine to:
      obtain a set of audio signals via a microphone array of a mobile device;
      obtain a set of inertial signals via a set of inertial sensors of the mobile device, the microphone array and the set of inertial sensors having a shared coordinate system;
      identify a location of a targeted object to beamform within a camera feed captured via a set of one or more cameras imagining an environment of the mobile device, wherein
      an off-board camera of the set of one or more cameras resides off-board the mobile device, and
      the location of the targeted object is identified based, at least in part, on data received at the mobile device from a remote computing device via a wireless communications network that is obtained from one or more images captured by the off-board camera;
      determine a parameter of a beamforming function that defines a beamforming region containing the targeted object based on the set of inertial signals, the location of the targeted object, and an indicia of a changing position of the mobile device, the parameter including at least a beam vector originating at the microphone array and intersecting the targeted object;
      apply the beamforming function to the set of audio signals using the parameter to obtain a set of processed audio signals that increases a signal-to-noise ratio of an audio source within the beamforming region relative to the set of audio signals; and
      output the set of processed audio signals.

2. The computing system of claim 1, wherein a camera of the set of one or more cameras resides on-board the mobile device, and has the shared coordinate system with the microphone array and the set of inertial sensors; and
   wherein the camera feed is processed by the mobile device.

3. The computing system of claim 2, wherein the mobile device includes a head mounted display (HMD) device.

4. The computing system of claim 1, wherein the targeted object is selected by a user input received via a user interface of the mobile device.

5. The computing system of claim 1, wherein the set of one or more cameras includes a depth camera and/or an infrared camera.

6. The computing system of claim 1, wherein the instructions are further executable by the logic machine to:
   apply machine vision to individual frames of the camera feed to identify the targeted object within each of the individual frames, the machine vision including an object recognition function that identifies the targeted object within individual frames of the camera feed.

7. The computing system of claim 6, wherein the targeted object is a human subject, and wherein the object recognition function includes human body classification and/or facial recognition.

8. The computing system of claim 1, wherein the instructions are further executable by the logic machine to:
   determine an additional parameter of the beamforming function based on the set of inertial signals and the location of the targeted object, the additional parameter including a beam width surrounding the beam vector;
   wherein the beamforming function is applied to the set of audio signals using the additional parameter to obtain the set of processed audio signals;
   wherein the beam width is further based on a distance of the location of the targeted object to the microphone array and/or a proximity of the targeted object to another audio source.

9. The computing system of claim 8, wherein the instructions are further executable by the logic machine to:
   vary one or more of the beam vector and/or beam width over time responsive to a further change in positioning of the mobile device relative to the targeted object as indicated by the set of inertial signals and/or the location of the targeted object identified within the camera feed.

10. The computing system of claim 8, wherein the instructions are further executable by the logic machine to:
    determine the change in positioning of the mobile device by estimating a future location of the targeted object at a future time relative to the mobile device based on motion of the targeted object observed across individual frames of the camera feed; and
    vary one or more of the beam vector and/or a beam width responsive to the future location prior to identifying an updated location of the targeted object within the camera feed at the future time.

11. The computing system of claim 1, wherein the instructions are further executable by the logic machine to:
    reproduce the set of processed audio signals via an audio speaker of the mobile device;
    store an identifier of the targeted object with the set of processed audio signals in a memory device; and
    convert human speech contained within the set of processed audio signals to text.

12. The computing system of claim 1, wherein the beamforming function is one of a plurality of beamforming functions that define respective beamforming regions for a plurality of targeted objects; and wherein the instructions are further executable by the logic machine to:
  upon two of the plurality of targeted objects approaching each other, adjust a beam vector and/or a beam width of at least one of the respective beamforming regions away from at least another of the respective beamforming regions to maintain a threshold distance between the respective beamforming regions and/or reduce overlap between the respective beamforming regions.

13. The computing system of claim 1, wherein the beamforming function is one of a plurality of beamforming functions that define respective beamforming regions for a plurality of targeted objects; and wherein the instructions are further executable by the logic machine to:
  upon two of the plurality of beamforming regions intersecting with each other, combine the two or more beamforming regions into a shared beamforming region containing their respective targeted objects.

14. The computing system of claim 1, wherein the instructions are further executable by the logic machine to:
  identify a location of a targeted exclusion region within the environment of the mobile device within the camera feed;
  determine a parameter of a suppression beamforming function that defines a suppression beamforming region containing the targeted exclusion region based on the set of inertial signals and the location of the targeted exclusion region, the parameter including one or more of a beam vector and/or a beam width; and
  apply the suppression beamforming function to the set of audio signals using its parameter, in combination with the beamforming function, to further attenuate an audio source within the suppression beamforming region.

15. The computing system of claim 1, wherein the data includes positioning data that is within a different coordinate system than a positioning of the mobile device; and
  wherein the instructions are further executable by the logic machine to:
    translate the positioning data into a coordinate system of the positioning of the mobile device to determine a relative positioning of the mobile device with respect to the targeted object.

16. A head mounted display (HMD) device supporting audio receive beamforming, the device comprising:
  a microphone array;
  a set of inertial sensors;
  a set of one or more forward-facing cameras;
  a logic machine; and
  a storage machine having instructions stored thereon executable by the logic machine to:
    obtain a set of audio signals via the microphone array;
    obtain a set of inertial signals via the set of inertial sensors;
    obtain a camera feed captured via the set of one or more forward-facing cameras;
    identify a location of a targeted object to beamform within the camera feed relative to a coordinate system of the HMD device;
    determine a parameter of a beamforming function that defines a beamforming region containing the targeted object based on the set of inertial signals, the location of the targeted object, and an indicia of a changing position of the HMD device, the parameter including at least a beam vector originating at the HMD device and intersecting the targeted object, wherein the beamforming function is one of a plurality of beamforming functions that define respective beamforming regions for a plurality of targeted objects;
    apply the beamforming function to the set of audio signals using the parameter to obtain a set of processed audio signals that increases a signal-to-noise ratio of an audio source within the beamforming region relative to the set of audio signals;
    output the set of processed audio signals; and
    upon two of the plurality of targeted objects approaching each other, adjust a beam vector and/or a beam width of at least one of the respective beamforming regions away from at least another of the respective beamforming regions to maintain a threshold distance between the respective beamforming regions and/or reduce overlap between the respective beamforming regions.

17. The HMD device of claim 16, wherein the instructions are further executable by the logic machine to determine an additional parameter of the beamforming function based on the set of inertial signals and the location of the targeted object, the additional parameter including a beam width surrounding the beam vector; and
  wherein the beam width is further based on a distance of the location of the targeted object to the microphone array and/or a proximity of the targeted object to another audio source.

18. The HMD device of claim 16, wherein the instructions are further executable by the logic machine to:
  reproduce the set of processed audio signals via an audio speaker of the HMD device;
  store an identifier of the targeted object with the set of processed audio signals in the storage device; and
  convert human speech contained within the set of processed audio signals to text displayed via a display device of the HMD device.

19. A method performed by a computing system for audio receive beamforming, comprising:
  obtaining a set of audio signals via a microphone array of a mobile device;
  obtaining a set of inertial signals via a set of inertial sensors of the mobile device, the microphone array and the set of inertial sensors having a shared coordinate system;
  identifying a location of a targeted object to beamform within a camera feed captured via a set of one or more cameras imagining an environment of the mobile device;
  determining a parameter of a beamforming function that defines a beamforming region containing the targeted object based on the set of inertial signals, the location of the targeted object, and an indicia of a changing position of the mobile device, the parameter including at least a beam vector originating at the microphone array and intersecting the targeted object;
  applying the beamforming function to the set of audio signals using the parameter to obtain a set of processed audio signals that increases a signal-to-noise ratio of an audio source within the beamforming region relative to the set of audio signals;
  outputting the set of processed audio signals to the mobile device;
  determine a change in positioning of the mobile device relative to the targeted object by estimating a future location of the targeted object at a future time relative to the mobile device based on motion of the targeted object observed across individual frames of the camera feed; and vary one or more of a beam vector and/or a beam width of the beamforming function responsive to the future location prior to identifying an updated location of the targeted object within the camera feed at the future time.

20. The method of claim 19, wherein the set of one or more cameras includes one or more of a depth camera and/or an infrared camera residing on-board the mobile device; and wherein the set of one or more cameras, the microphone array, and the set of inertial sensors have the shared coordinate system.

* * * * *